UNITED STATES PATENT OFFICE 3,575,978
Patented Apr. 20, 1971

---

3,575,978
INDUSTRIAL PRODUCTION OF O,S-DIALKOXY-CARBONYLTHIAMINE COMPOUNDS
Kanji Tokuyama, Osaka-shi, Takashi Maeda, Kitakat-suragi-gun, and Kenji Ikawa, Osaka-shi, Japan, assignors to Shionogi & Co., Ltd., Osaka, Japan
No Drawing. Filed May 16, 1969, Ser. No. 825,435
Int. Cl. C07d 51/42
U.S. Cl. 260—256.5        20 Claims

ABSTRACT OF THE DISCLOSURE

An S-alkali metal salt of thiol type thiamine is reacted with each about 1.0 to about 1.2 mol equivalent of lower alkyl chlorocarbonate, alkali hydroxide and lower alkyl chlorocarbonate in that order respectively in an aqueous medium containing from 0 to about 50 volume/volume percent of halogeno-hydrocarbon of not more than 10 carbon atoms to give high purity of O,S-dialkoxycarbonylthiamine compounds economically and industrially.

---

The present invention relates to an industrial production of O,S-dialkoxycarbonylthiamine compounds. More particularly, it relates to an improvement in the production of O,S-di(lower)alkoxycarbonylthiamine compounds which are useful as the long-acting vitamin $B_1$ agents.

The O,S-di(lower)alkoxycarbonylthiamine compounds are represented by the formula:

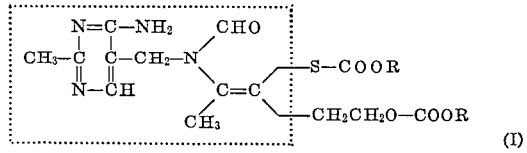

(I)

wherein R represents an alkyl group having not more than 5 carbon atoms (e.g. methyl, ethyl, n-butyl). [The partial structure encompassed by the dotted line in the above formula will be hereinafter summarized as "Thia."]

The said O,S-di(lower)alkoxycarbonylthiamine compounds (I) have heretofore been prepared by the following several methods:

Method A

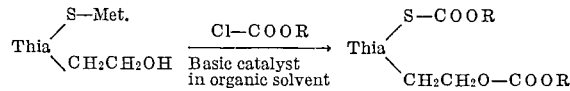

Method B

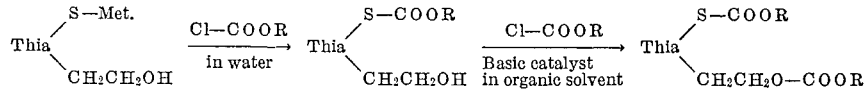

Method C

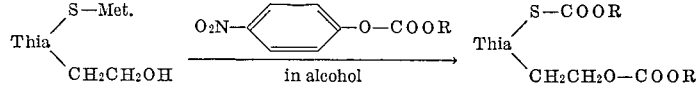

Method D

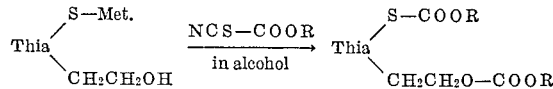

wherein Met. is an alkali metal (e.g. sodium, potassium) and R has the same significance as designated above. Of these methods, the methods (C) and (D) afford the objective O,S-di(lower)alkoxycarbonylthiamine compounds (I) in better yields than the methods (A) and (B). Since the former methods are those of using special (lower)alkoxycarbonylating agents, however, they cannot be free from economical disadvantages ascribing to the specialty of the (lower)alkoxycarbonylating agents. On the other hand, the latter methods have the defects such as expensiveness or inconvenience on operation owing to employment of the basic catalyst (i.e. tertiary amine, alkali alkoxide) as well as lowness of the yield.

Attaching importance to profitableness of lower alkyl chlorocarbonate as raw materials, the present inventors have investigated variously on the improvement in the production of O,S-di(lower)alkoxycarbonylthiamine by using lower alkyl chlorocarbonate. It has been known that the reaction of an S-alkali metal salt of thiol type thiamine with lower alkyl chlorocarbonate in an aqueous medium affords only S-(lower)alkoxycarbonylthiamine. For the purpose of reinvestigation on this reaction, the present inventors have effected the following experiment by using ethyl chlorocarbonate.

S-sodium salt of thiol type thiamine was allowed to react with 2 mol equivalent of ethyl chlorocarbonate in water, and there was obtained S-ethoxycarbonylthiamine as a main product. From the reaction mixture, there were obtained several amounts of side products (i.e. O-ethoxycarbonylthiamine, O,S-diethoxycarbonylthiamine, O,N,S-triethoxycarbonylthiamine, O,N,N,S-tetraethoxycarbonylthiamine).

The result of the said experiment shows that the (lower) alkoxycarbonylation of the O-position in water is very difficult contrarily to that of the S-position, that excessive employment of lower alkyl chlorocarbonate causes only to produce poly(lower) alkoxycarbonyl compounds partially, and that it is very difficult to accelerate the production of O,S-di(lower)alkoxycarbonylthiamine by increasing the amount of lower alkyl chlorocarbonate.

There has been now discovered that the rearrangement of the (lower)alkoxycarbonyl group from the S-position to the O-position turns up by reacting an S-(lower)alkoxycarbonylthiamine represented by the following formula:

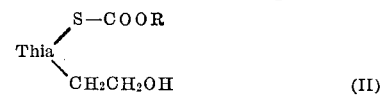

(II)

wherein R has the same significance as designated above with almost equimolar amount of alkali hydroxide in a sufficient amount of an aqueous medium containing from 0 to about 50 volume/volume percent of halogenohydrocarbon of not more than 10 carbon atoms to give an S-alkali metal salt of O-(lower)alkoxycarbonylthiamine represented by the formula:

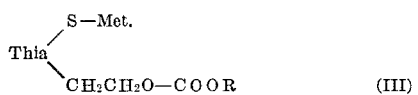

wherein R has the same significance as designated above. There has been also discovered that the thus-produced S-alkali metal salt of O-(lower)alkoxycarbonylthiamine (III) is reacted with lower alkyl chlorocarbonate in an aqueous medium containing from 0 to about 50 volume/volume percent of halogenohydrocarbon of not more than 10 carbon atoms to give the objective O,S-di(lower)alkoxycarbonylthiamine compounds (I) in a very high yield with high purity. Especially, it is a conspicuous characteristic of this invention that O,S-di(lower)alkoxycarbonylthiamine compounds can be obtained by using lower alkyl chlorocarbonate in an aqueous medium, although this reaction has been known to execute difficultly in an aqueous medium owing to difficult solubility of S-(lower)alkoxycarbonylthiamine in water. The present invention is substantially based on these discoveries.

The process of the present invention is represented by the following formulae:

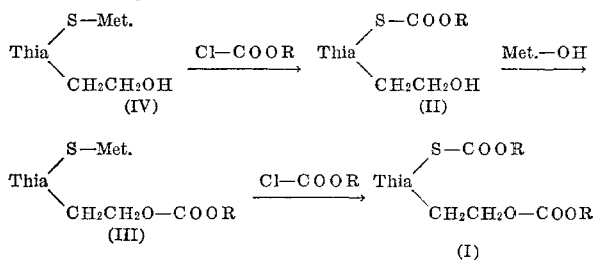

wherein R and Met. have each the same significance as designated above. As understood from the above formulae, the present process requires no expensive and inconvenient basic catalyst (i.e. tertiary amine, alkali alkoxide). Since the present process is very economical in employment of lower alkyl chlorocarbonate in an aqueous medium containing from 0 to about 50 volume/volume percent of halogenohydrocarbon of not more than 10 carbon atoms and prevails by far the known methods in yields, reaction rates and purities of the products, the present process is very excellent as an industrial production of O,S-di(lower)alkoxycarbonylthiamine compounds (I). For instance, yields of O,S-diethoxycarbonylthiamine in the method (A) is less than 45%, but that of the present process is more than 86% with high purity.

The process of the present invention comprises reacting an S-alkali metal salt of thiol type thiamine (IV) with about 1.0 to about 1.2 mol equivalent of lower alkyl chlorocarbonate, about 1.0 to about 1.2 mol equivalent of alkali hydroxide and about 1.0 to about 1.2 mol equivalent of lower alkyl chlorocarbonate in that order respectively in an aqueous medium containing from 0 to about 50 volume/volume percent of halogenohydrocarbon of not more than 10 carbon atoms to give the O,S-di(lower)alkoxycarbonylthiamine compounds (I). Since the substantial part of this invention is to introduce the second (lower)alkoxycarbonyl group into the S-(lower)alkoxycarbonylthiamine (II) in an aqueous medium containing from O to about 50 volume/volume percent of halogenohydrocarbon of not more than 10 carbon atoms, the present process involves necessarily both the production of O,S-di(lower)alkoxycarbonylthiamine compounds (I) starting from the S-alkali metal salt of thiol type thiamine (IV) and the production thereof starting from the S-(lower)alkoxycarbonylthiamine (II).

The starting material, alkali metal salt of thiol type thiamine of the formula (IV), may be prepared by reacting a salt of thiamine (e.g. thiamine chloride hydrochloride, thiamine mononitrate, thiamine monocyanate, thiamine monophosphoric acid salt, thiamine mono- naphthalene-1,5-disulfonic acid salt or thiamine monosulfate) with alkali hydroxide (e.g. potassium hydroxide, sodium hydroxide) in a conventional manner. For instance, the S-sodium salt of thiol type thiamine is prepared by reacting thiamine chloride hydrochloride with 3.0 mol equivalent of sodium hydroxide in water and also prepared by reacting thiamine mononitrate with 2.0 mol equivalent of sodium hydroxide in water. This preparation of the starting material may be ordinarily effected at a range of temperature from about 0 to about 50° C. Although the each successive steps in the production of O,S-di(lower)alkoxycarbonylthiamine compounds (I) are illustrated independently in the following passages, these may be usually be carried out subsequently to the preparation of the starting S-alkali metal salt of thiol type thiamine (IV).

Firstly, the starting S-alkali metal salt of thiol type thiamine (IV) is allowed to react with about 1.0 to about 1.2 mol equivalent of lower alkyl chlorocarbonate in an aqueous medium containing from 0 to about 50 volume/volume percent of halogenohydrocarbon of not more than 10 carbon atoms. As the aqueous medium, there are exemplified water and a mixture of water and halogenohydrocarbon. Examples of the halogenohydrocarbon are chloroform, ethylene chloride, trichloroethane and methylene chloride. The reaction may be ordinarily effected in a range of temperature from about 0 to about 50° C. Since the reaction rate becomes more rapid together with elevation of the reaction temperature it is necessary for checking side reactions (i.e. mainly poly (lower)alkoxycarbonylation) to consider the correlation between the reaction time and the reaction temperature. For instance, the reaction may be favorably effected for 30 to 40 minutes in the case of 0° C. and for 1 to 3 minutes in the case of 40 to 50° C. The addition of lower alkyl chlorocarbonate may be effected by portionwise addition or preferably one stroke of addition in a short time. Still, it is more favorable to adjust the pH of the solution of the starting material before the reaction and employment of lower alkyl chlorocarbonate so that the reaction mixture after this reaction may be rather slightly alkaline than neutral.

Secondly, the thus-prepared S-(lower)alkoxycarbonylthiamine (II) is allowed to react with about 1.0 to about 1.2 mol equivalent of alkali hydroxide in the same aqueous medium as described above for the rearrangement of the (lower)-alkoxycarbonyl group from the S-position to the O-position. This reaction may be ordinarily effected in a range of temperature from about 0 to about 50° C. In view of rapid reaction rate of this reaction, it is also necessary to consider the correlation between the reaction time and the reaction temperature. For instance, the reaction may be favorably effected for 30 to 40 minutes in the case of 0 to 5° C. and for about 1 minute in the case of 40° C.

Thirdly, the S-alkali metal salt of O-(lower)alkoxycarbonylthiamine (III) is allowed to react with about 1.0 to about 1.2 mol equivalent of lower alkyl chlorocarbonate in the same aqueous medium as described above. After the reaction is started in water, the halogenohydrocarbon may be added to the reaction mixture in any of the latter steps. This reaction may be ordinarily effected in a range of temperature from about 0 to about 50° C. Since the reaction rate becomes more rapid together with elevation of the reaction temperature, it is necessary for checking side reactions (i.e. mainly poly(lower)alkoxycarbonylation) to consider the correlation between the reaction time and the reaction temperature. For instance, this reaction may be favorably effected for 60 to 90 minutes in the case of 0° C. and for 2 to 5 minutes in the case of 50° C. Isolation and purification of the objective O,S-di (lower) alkoxycarbonylthiamine compounds may be effected in a conventional manner. Although the present process has been hereinabove illustrated step by step, these steps may be effected successively without isolation of the intermediary products. Sufficient stirring and restriction of the amount of reagents are required in the respective steps of the present process for checking poly(lower)alkoxycarbonylation.

Presently-preferred and practical embodiments of the present invention are illustratively shown in the following examples. The relationship of parts by weight to parts by weight to parts by volume is the same as that between grams and millilitres. Temperatures are set forth in degrees centigrade.

EXAMPLE 1

Thiamine mononitrate (40 parts by weight) is mixed with water (200 parts by volume) and the mixture is stirred at room temperature for 10 minutes to dissolve. To this solution, there is added a solution of sodium hydroxide (10.44 parts by weight) in water (24 parts by volume), and the resultant mixture is stirred at 20° C. for about 2 hours to prepare an aqueous solution of S-sodium salt of thiol type thiamine.

This aqueous solution is cooled at 10° C., mixed with ethyl chlorocarbonate (15.04 parts by weight) and stirred at 0 to 15° C. for 2 hours. To this mixture, there is added a cold solution of sodium hydroxide (5.33 parts by weight) in water (12 parts by volume) and 2 minutes later ethyl chlorocarbonate (13.90 parts by weight) is added dropwise at 8 to 10° C. in 1.5 hours. The resultant mixture is stirred at 10 to 15° C. for 1.5 hours for completing the reaction and shaken with chloroform (300 parts by volume). The aqueous layer is shaken with chloroform (50 parts by volume). The two chloroform layers are combined and shaken with 15% hydrochloric acid (50 parts by volume) sufficiently to prepare the hydrochloride. The aqueous layer is shaken with chloroform (30 parts by volume). The chloroform layer is dried over anhydrous sodium sulfate and the chloroform is evaporated. The residue is transmitted to an open vessel and the residual chloroform is evaporated at room temperature. The obtained substance is allowed to stand at room temperature and absorbs moisture to give crystalline hydrate. The hydrate is dried under reduced pressure to give O,S-diethoxycarbonylthiamine hydrochloride monohydrate (51.07 parts by weight) as crystals melting at 112.5 to 119.5° C. The yield is 86.90% (Purity: 94.9 to 95.3%). The crystals are washed with ethyl acetate (150 parts by volume) to give crystals (46.62 parts by weight) (purity: 99.2 to 100.7%) melting at 119.5 to 120.5° C. This susbtance is recrystallized from acetone to give colorless prisms melting at 121 to 123° C. (decomp.). When this substance is chromatographed on the thin layer chromatography and colored with the Dragendorff reagent, a complete single spot is observed.

Note: Purity Assay.—To a solution of the sample accurately weighed in 0.01 N hydrochloric acid (1 ml.), there was added 1 N sodium hydroxide (1 ml.). The resultant mixture was stirred gradually, warmed at 30° C. for 5 minutes, made acidic with 1 N hydrochloric acid (1.5 ml.) and there was added acid potassium chloride solution to make 25 ml. quantitatively, which was used as a test solution. To this solution (5 ml.) were added cyanogen bromide solution (3 ml.) and 30% sodium hydroxide (2 ml.), and the resultant mixture was shaken with isobutanol. The isobutanol layer was subjected to the fluorophotometric method in a conventional manner. As the reference standard, there was used a solution of thiamine chloride hydrochloride weighed accurately in acid potassium chloride solution (25 ml.) [Yamamoto, et al.: Vitamins (Kyoto), vol. 25, 478 to 482 (1962)].

EXAMPLE 2

To a solution of thiamine chloride hydrochloride (33.73 parts by weight) in water (300 parts by volume), there is added a solution of sodium hydroxide (12.38 parts by weight) in water (31 parts by volume), and the resultant mixture is stirred at 40° C. for 10 minutes. Ethyl chlorocarbonate (11.28 parts by weight) is added with stirring to the solution and stirred at 30° C. for 10 minutes. A solution of sodium hydroxide (4.08 parts by weight) in water (10 parts by weight) is added thereto and stirred at 30° C. for 1 to 3 minutes. Ethyl chlorocarbonate (11.72 parts by weight) is added to the mixture and stirred at 40° C. for 10 minutes. The reaction mixture is shaken with chloroform (300 parts by volume) and treated similarly to Example 1 to give O,S-diethoxycarbonylthiamine hydrochloride monohydrate (44.50 parts by weight). The yield is 92.5%.

EXAMPLE 3

Thiamine mononitrate (40 parts by weight) is mixed with water (400 parts by volume) and stirred at room temperature for 10 minutes to dissolve. To this solution, a solution of sodium hydroxide (10.44 parts by weight) in water (24 parts by volume) is added and the mixture is stirred at 28° C. for about half an hour. The reaction mixture is cooled at 10° C., mixed with ethyl chlorocarbonate (15.04 parts by weight) and stirred at 20° C. for half an hour. This mixture is cooled at 7° C., mixed with a solution of sodium hydroxide (5.33 parts by weight) in water (12 parts by volume) and 2 minutes later a solution of ethyl chlorocarbonate (13.90 parts by weight) in chloroform (100 parts by volume) is added to the mixture at 5° C. The resultant mixture is stirred at 40° C. for 5 minutes and the chloroform layer is separated. The aqueous layer is shaken with chloroform (300 parts by volume) and again with chloroform (50 parts by volume). These chloroform layers are combined and mixed with 15% hydrochloric acid (50 parts by volume) to give O,S-diethoxycarbonylthiamine hydrochloride. The chloroform layer is separated, and the residue is crystallized from ethyl acetate (150 parts by volume) and water (2.2 parts by volume) to give O,S-diethoxycarbonylthiamine hydrochloride monohydrate (53.45 parts by weight) as crystals melting at 119 to 120° C. The yield is 90.95% (Purity: 95.1 to 96.3%). This substance is recrystallized from acetone to give crystals (50.88 parts by weight) melting at 121 to 123° C. (decomp.).

EXAMPLE 4

To a solution of S-sodium salt of thiol type thiamine dihydrate (34.04 parts by weight) in water (200 parts by volume) and chloroform (100 parts by volume), there is added methyl chlorocarbonate (9.72 parts by weight), and the resultant mixture is stirred at 20° C. for 10 minutes. A solution of sodium hydroxide (4.40 parts by weight) in water (12 parts by volume) is added thereto and stirred at 30° C. for 1 minute. To this solution, there s added methyl chlorocarbonate (10.40 parts by weight), and the mixture is stirred at 30° C. for 60 minutes. The reaction mixture is treated similarly to give O,S-dimethoxycarbonylthiamine hydrochloride (37.88 parts by weight). The yield is 90.0%.

EXAMPLE 5

To a solution of S-sodium salt of thiol type thiamine dihydrate (34.04 parts by weight) in water (250 parts by volume), there are added ethyl chlorocarbonate (11.28 parts by weight) and a solution of sodium hydroxide (4.08 parts by weight) in water (11.0 parts by volume) while reaction in that order and the resultant mixture is treated with a solution of ethyl chlorocarbonate (11.72 parts by weight) in ethylene chloride (200 parts by volume) similarly to give O,S-diethoxycarbonylthiamine hydrochloride monohydrate (43.77 parts by weight). The yield is 91.0%.

EXAMPLE 6

S-sodium salt of thiol type thiamine dihydrate is reacted with methyl chlorocarbonate, sodium hydroxide and methyl chlorocarbonate respectively in an aqueous medium similarly to Example 1 to give O,S-dimethoxycarbonylthiamine hydrochloride as crystals melting at 135 to 136° C. The yield is 90.5%.

EXAMPLE 7

S-potassium salt of thiol type thiamine is reacted with n-butyl chlorocarbonate, potassium hydroxide and n-butyl chlorocarbonate respectively similarly to Example 1 to give O,S-di-n-butoxycarbonylthiamine hydrochloride. The yield is 88.60%.

EXAMPLE 8

To a solution of thiamine mononitrate in water, there is added sodium hydroxide to give an aqueous solution of S-sodium salt of thiol type thiamine. n-Butyl chlorocarbonate and chloroform are added to the solution to give S-n-butoxycarbonylthiamine, and there are added an aquous solution of sodium hydroxide and n-butyl chlorocarbonate in that order to give O,S-di-n-butoxycarbonylthiamine hydrochloride. The yield is 91.3%.

EXAMPLE 9

A solution of sodium hydroxide (9.84 parts by weight) in water (24 parts by volume) is added to water (400 parts by volume), and the resultant solution is warmed at 25±1° C. with stirring. To this solution, there is added thiamine mononitrate (40 parts by weight) and the resultant mixture is stirred at 25± 1° C. for 2 minutes. The reaction mixture is cooled at 10° C., and ethyl chlorocarbonate (13.59 parts by weight) is added thereto. The mixture is stirred at 10° C. for 10 minutes under cooling, a solution of sodium hydroxide (4.97 parts by weight) in water (12 parts by volume) is added and the mixture is stirred at 11±1° C. for 3 minutes. A solution of ethyl chlorocarbonate (13.97 parts by weight) in chloroform (100 parts by volume) is added thereto at 14±1° C. and the mixture is stirred at the same temperature for 15 minutes. To the mixture, chloroform (135 parts by volume) is added and the resultant mixture is stirred. The chloroform layer is separated from the aqueous layer, which is shaken with chloroform (50 parts by volume). The two chloroform layers are combined, mixed with 35% hydrochloric acid (14 parts by weight) to form O,S-diethoxycarbonylthiamine hydrochloride and the chloroform is evaporated. The residue is crystallized from ethyl acetate (200 parts by volume) and water (2.2 parts by volume) to give O,S-diethoxycarbonylthiamine hydrochloride monohydrate (57.72 parts by weight) as crystals melting at 119 to 120° C. (decomp.). The yield is 98.21% (Purity: 99.50 to 99.86%). The crude crystals are recrystallized from acetone (200 parts by volume) to give crystals (54.83 parts by weight) melting at 121 to 123° C. (decomp.).

What is claimed is:

1. Process for preparing O,S-di(lower)alkoxycarbonylthiamine compounds which comprises reacting an S-alkali metal salt of thiol type thiamine with about 1.0 to about 1.2 mol equivalent of lower alkyl chlorocarbonate, about 1.0 to about 1.2 mol equivalent of alkali hydroxide and about 1.0 to about 1.2 mol equivalent of lower alkyl chlorocarbonate in that order respectively in an aqueous medium containing from 0 to about 50 volume percent of halogenohydrocarbon of not more than 10 carbon atoms.

2. Process according to claim 1, in which the lower alkyl is methyl.

3. Process according to claim 1, in which the lower alkyl is ethyl.

4. Process according to claim 1, in which the lower alkyl is n-butyl.

5. Process according to claim 1, in which the reaction is effected in a range of temperature from about 0 to about 50° C.

6. Process according to claim 1, in which the medium is water.

7. Process according to claim 1, in which the halogenohydrocarbon is chloroform.

8. Process according to claim 1, in which the halogenohydrocarbon is ethylene chloride.

9. Process according to claim 3, in which the range of temperature is from about 5 to about 45° C.

10. Process according to claim 3, in which the medium is water.

11. Process according to claim 3, in which the halogenohydrocarbon is chloroform and the reaction is effected in a range of temperature from about 0 to about 50° C.

12. Process for preparing O,S-diethoxycarbonylthiamine compounds which comprises reacting an S-alkali metal salt of thiol type thiamine with about 1.0 to about 1.2 mol equivalent of ethyl chlorocarbonate and about 1.0 to about 1.2 mol equivalent of alkali hydroxide in water and about 1.0 to about 1.2 mol equivalent of ethyl chlorocarbonate in an aqueous medium containing from about 1 to about 50 volume/volume percent of chloroform.

13. Process according to claim 12, in which the reaction is effected in a range of temperature from about 0 to about 50° C.

14. Process according to claim 12, in which the last step is effected in an aqueous medium containing from about 5 to about 45 volume/volume percent of chloroform.

15. Process according to claim 12, in which the reaction is effected in a range of temperature from about 5 to about 45° C.

16. Process according to claim 14, in which the reaction is effected in a range of temperature from about 5 to about 45° C.

17. Process for preparing O,S-diethoxycarbonylthiamine compounds which comprises reacting an S-alkali metal of thiol type thiamine with about 1.0 to about 1.2 mol equivalent of ethyl chlorocarbonate in water and about 1.0 to about 1.2 mol equivalent of chloroform and about 1.0 to about 1.2 mol equivalent of ethyl chlorocarbonate in an aqueous medium containing from about 1 to about 50 volume/volume percent of chloroform.

18. Process according to claim 17, in which the reaction is effected in a range of temperature from about 0 to about 50° C.

19. Process according to claim 17, in which the latter two steps are effected in an aqueous medium containing from about 5 to about 45 volume/volume percent of chloroform.

20. Process according to claim 17, in which the reaction is effected in a range of temperature from about 5 to about 45° C.

No references cited.

ALEX MAZEL, Primary Examiner

R. J. GALLAGHER, Assistant Examiner

U.S. Cl. X.R.

260—999